United States Patent [19]

Kornylak

[11] 4,098,375

[45] Jul. 4, 1978

[54] SILICONE PUTTY RETARDER

[76] Inventor: Andrew T. Kornylak, 400 Heaton St., Hamilton, Ohio 45011

[21] Appl. No.: 401,420

[22] Filed: Sep. 27, 1973

Related U.S. Application Data

[63] Continuation-in-part of Ser. No. 351,061, Apr. 13, 1973, abandoned, which is a continuation of Ser. No. 176,742, Aug. 31, 1971, abandoned, which is a continuation of Ser. No. 850,835, Aug. 18, 1969, abandoned.

[51] Int. Cl.² ............................................. F16D 57/02
[52] U.S. Cl. ................................. 188/290; 188/268; 192/58 A
[58] Field of Search ..................... 188/290, 296, 268; 192/58 A, 58 C, 58 R; 23/134; 193/35 A

[56] References Cited

U.S. PATENT DOCUMENTS

| 1,114,691 | 10/1914 | Herz ...................................... 188/268 |
| 2,077,080 | 4/1937 | Tolman ................................. 188/290 |
| 2,618,370 | 11/1952 | Orwin ............................... 188/290 X |
| 3,295,639 | 1/1967 | Smith ............................. 193/35 A X |
| 3,312,320 | 4/1967 | Froio ................................. 193/35 A |

FOREIGN PATENT DOCUMENTS 664,182  4/1929  France .................................. 188/290

OTHER PUBLICATIONS

Spooner, L. W., *Silicone Putty as an Engineering Material*, Product Engineering Jan. 1950, pp. 90–93.

Primary Examiner—George E. A. Malvosa
Attorney, Agent, or Firm—Beall & Jeffery

[57] ABSTRACT

A retarder roller for limiting the speed of a free running load on an inclined conveyor. The roller comprises a stator and a rotor rotatable mounted on the stator and forming a housing for the stator. The housing is filled with silicone putty. The stator and housing are provided with vanes for cutting through and displacing the putty as the housing is rotated.

14 Claims, 7 Drawing Figures

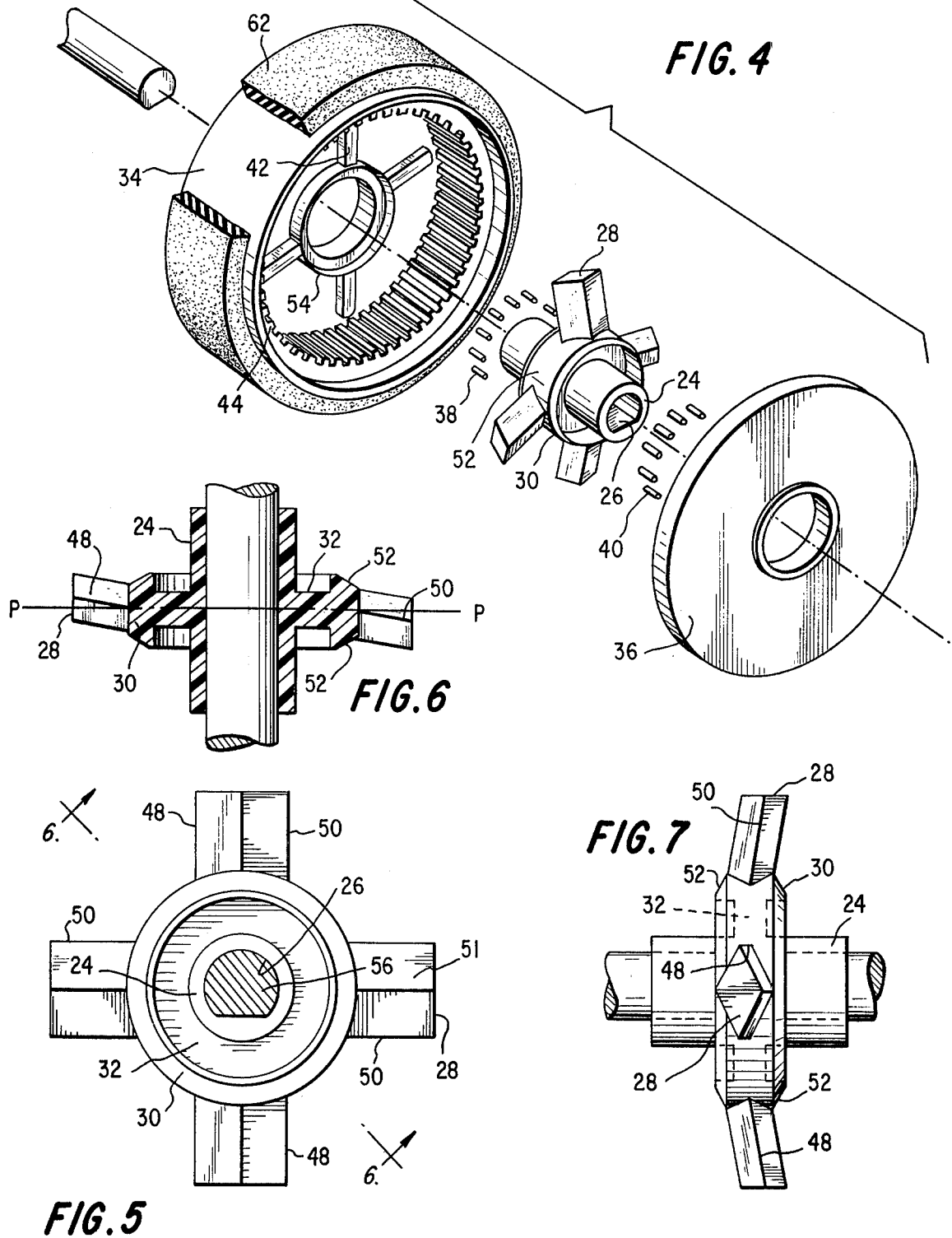

SILICONE PUTTY RETARDER

This application is a continuation-in-part of my prior copending application Ser. No. 351,061, filed Apr. 13, 1973, now abandoned, which was a continuation of my prior application Ser. No. 176,742, filed Aug. 31, 1971, now abandoned, which is a continuation of my prior application Ser. No. 850,835, filed Aug. 18, 1969, now abandoned.

This invention relates to a conveyor and more particularly to a braking device for governing the speed of a free running load on an inclined conveyor.

The conveyor of the type herein referred to comprises a pair of spaced parallel rails with each rail provided with at least one row of closely spaced rollers. The rails are set at a pitch which is sufficient to allow gravity to move a load against the resistance of the rollers. If the pitch is too great the control of the load is lost and the load acquires a run away speed that could be disastrous. If the pitch is too small the load will not move under the influence of gravity. It is therefore an object of this invention to provide a conveyor which can be set at a pitch steep enough to insure movement of the load but is provided with a retarding device to prevent the load from acquiring a run away speed.

It is a further object of this invention to provide a governing device for retarding the speed of a load on a gravity type conveyor.

It is a further object of this invention to provide a device as aforesaid which can be used as a roller in supporting the load on a gravity type conveyor.

It is a further object of this invention to provide a device as aforesaid in which the resistance of the device is proportional to the speed of the load.

It is a further object of this invention to provide a device as aforesaid which can be substituted for the rollers or other braking devices now used in gravity type conveyors.

It is a further object of this invention to produce a device as aforesaid in which the retarder is of the same size as existing rollers to permit easy substitution of the instant retarder for standard rolls in existing installations without redesign.

These and other objects of the invention will become manifest on reading the following description in conjunction with the accompanying drawing wherein:

FIG. 4 is an exploded view of the retarder of this invention;

FIG. 5 is a side view of the stator;

FIG. 6 is a view taken on the line 6—6 of FIG. 5, and

FIG. 7 is a side view of FIG. 6.

Figure 1:
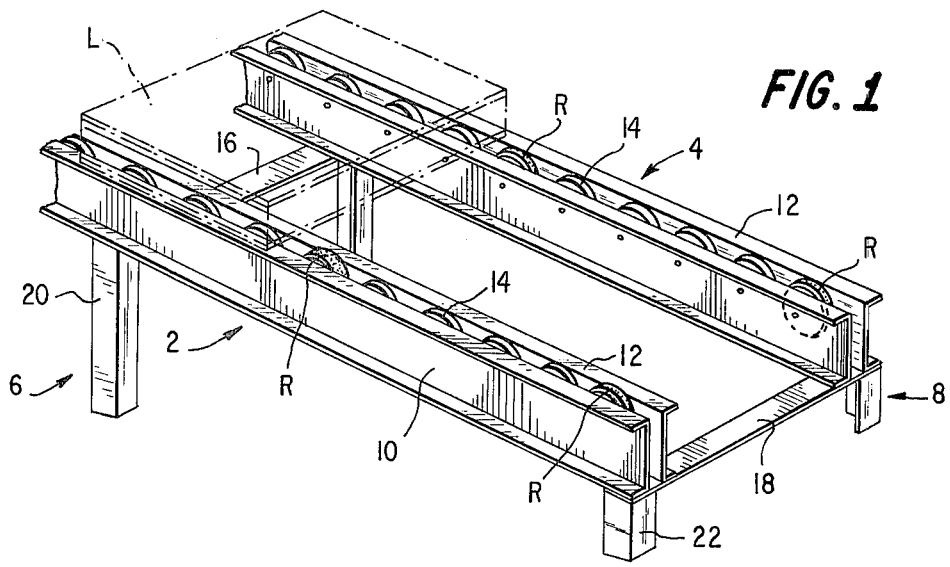
FIG. 1 is a perspective view of a gravity conveyor with the retarders in position to engage a pallet.
Figure 3:
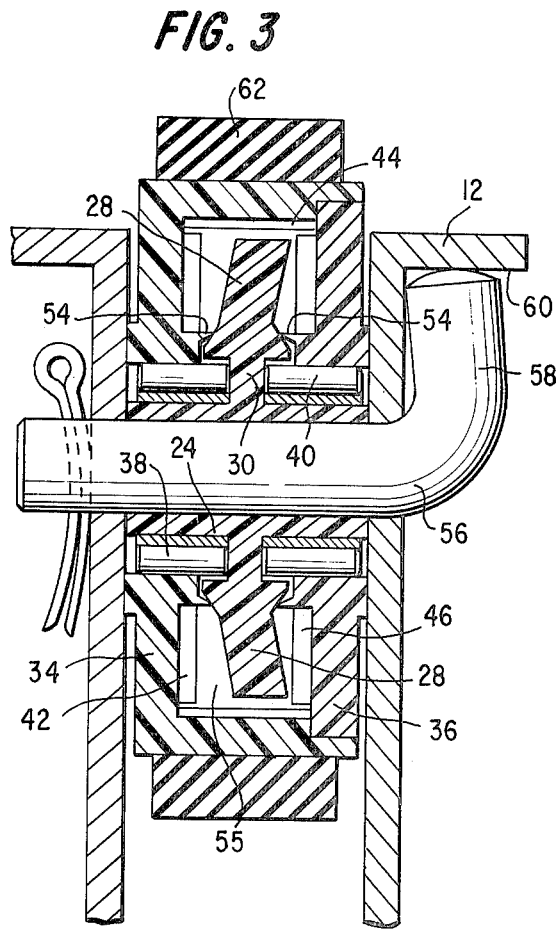
FIG. 3 is a view in section of the retarder.

In accordance with the invention selected rollers of each rail of the conveyor are formed to provide a retarder for limiting the speed of the load. The retarders each comprise a stator, having vanes, secured to the rail and a rotor secured around the stator to operate as a roller for the load and a housing for the stator. The housing is filled with a semi-solid dilatent fluid such as silicone putty and is formed with internal vanes to carry the putty in a circular orbit as the housing is rotated by the load.

The silicone putty, which can be SS-91, Silicone Bouncing Putty, a product of General Electric Company, will flow slowly when left in place. When low pressures are applied thereto, the rate of flow is not proportional to the force. Thus, it acts as a non-newtonian thixotropic liquid wherein the rate of flow increases slightly with shearing stress. At higher pressures the putty acts as a plastic solid, since rate of flow is proportional to shearing stress above a certain yield value. When pressures are applied suddenly, the putty becomes dilatant, i.e., the material becomes hard and brittle, and rate of flow increases less than proportionally with pressure. The vanes on the stator react against the putty and, through the putty and internal vanes, against the housing to limit the speed of rotation of the housing. It is a property of silicone putty that its resistance to deformation increases as the deforming force increases. When used in a conveyor, the putty will deform to permit the load to move within a selected speed limit but will strongly resist the movement of the load above this limit.

In another form of this invention a wheeled cart is supplied with at least one retarding roller of this invention.

With reference to the drawing there is disclosed a gravity type conveyor comprising a pair of spaced rails 2 and 4 supported at a preselected pitch by pedestals 6 and 8. Each rail comprises a pair of channel members 10 and 12 having rotatably mounted therebetween series of rollers 14 for transporting a load L. The pedestals comprise braces 16, 18 to which the rails are secured. Legs 20 and 22 of selected length support the braces and provide the selected pitch.

Selected rollers R of the series of rollers 14 are the speed controlling rollers of this invention. Each roller comprises a stator having a hub 24 provided with a D-shaped opening 26 and vanes 28 integral therewith and connected to the hub by a flange 30 having a reduced section 32. A rotor, comprising a pair of members 34 and 36 adhered together, is rotatably mounted on the stator by needle bearings 38 and 40. The inner surfaces of the members 34 and 36 are formed with vanes 42, 44, and 46 for a purpose to be described below.

The vanes 28 are shaped as rhomboids having the edges 48 and 50 formed at the acute angles. The alternate vanes are tipped in the same direction with the consecutive vanes tipped in opposite directions about a common plate P—P.

The stator member is formed with beveled surfaces 52 for engagement by sharp edged flexible lips 54. When assembled the lips are pressed against the surfaces 52 to form a seal to prevent the escape of the putty which fills the chamber 55.

The rollers are assembled between the channel members 10 and 12 and secured thereto by a locking pin 56 having a cross section congruent to the D shaped opening 26 and having an arm section 58 that is longer than the shortest distance between the opening and the undersurface 60 of channel member 12 to lock the pin against rotation. In the completed assembly the outside diameter of tire 62 of rollers R is slightly greater than the outside diameter of the other rollers to assure good contact with the load which is usually in the form of a loaded pallet having uneven roller engaging surfaces.

In operation, the moving load rotates the rotor. The internal vanes 42, 44, 46 urge the putty to rotate with the rotor and the rotating putty is carried past the fixed vanes 28 where either of the sharp edges 48 or 50 (depending on the direction of rotation of the putty) cut into the putty and force the putty to flow against the flat surfaces 51 of the vanes. The speed of the putty, as it is sliced and thrust by the fixed vanes, determines the resistance of the rotor to the rotating force produced by the load. This resistance determines the maximum speed attained by the load. The alternate tilting of vanes 28 prevents the successive cutting edges from slicing through the putty before the putty has flowed to heal the previous cutting. However, a lower maximum speed of the rotor could allow the putty to reform and heal and would permit successive cutting edges to be positioned in the same plane.

It is preferred to make the stator and rotor of synthetic plastic material such as nylon but metal could be used. The tire 62 is formed of an elastomeric material to provide sufficient friction to provide against undue slippage when suddenly engaged by the moving load.

Figure 2:
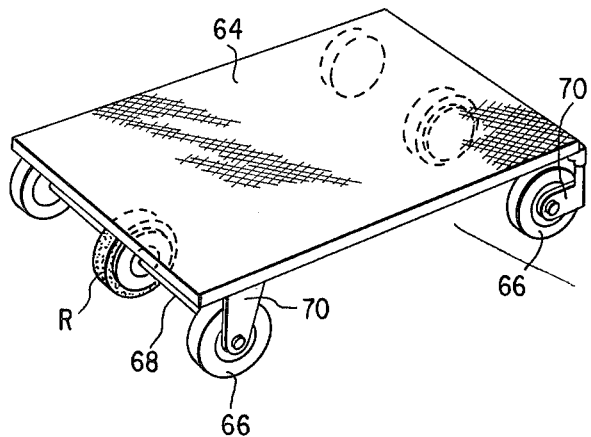
FIG. 2 is a perspective view of a conveyor cart for use on an inclined way with a pair of retarders for limiting the speed of the cart.

In FIG. 2 is disclosed a cart comprising a platform 64 carried by wheels 66. The wheels are rotatable on axle 68 supported in brackets 70 secured to the platform. Retarder rollers R are mounted on the axle. In use, the cart is rolled down an inclined trackway and is limited in speed by the retarding force of the rollers as set forth above.

While I have disclosed silicone putty as the deformable material other materials having the consistency and above noted properties of silicone putty, gelatinous substances, or grease, and which are classified as semi-solid materials can be used.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A retarder roller comprising a stator, a rotor surrounding the stator and forming an enclosed housing having walls, silicone putty in the housing, and means on the rotor and stator for deforming the material, wherein the deforming means comprises vanes on the stator and means on all the walls of the housing for holding the putty for rotation therewith, the vanes on the stator comprising members extending radially into the putty, each having a wedge shaped portion presenting a sharp edge opposite to the direction of rotation of the rotor and putty, the edges on consecutive vanes being on opposite sides of a common plane normal to the rotor axis.

2. A retarder roller according to claim 1 wherein an elastomeric tire is mounted on the rotor.

3. A retarder roller comprising a stator, a rotor surrounding the stator and forming an enclosed housing having walls, silicone putty in the housing, and means on the rotor and stator for deforming the material, wherein the deforming means comprises vanes on the stator and means on all the walls of the housing for holding the putty for rotation therewith, the vanes on the stator comprising members extending radially into the putty, each having a wedge shaped portion presenting a sharp edge opposite to the direction of rotation of the rotor and putty, the vanes being rhomboids with the acute angles extending circumferentially, the edges defined by the acute angles on consecutive vanes being on opposite sides of a common plane normal to the rotor axis.

4. A retarder roller as defined in claim 3 further including a tire of elastomeric material mounted on the rotor.

5. A retarder roller comprising,
a cylindrical housing member closed at its ends,
an inner axially extending member within the housing member having end portions extending through the ends of the housing to permit relative rotation of the members,
a semi-solid material within the housing member having dilatant fluid flow characteristics,
the inner surface of the housing member being provided with means for engaging and retaining the material against rotational movement relative thereto,
and angularly spaced blades on the inner member within the housing projecting substantially radially with respect thereto into the material,
said blades each including a wall surface with a sharp forward edge substantially facing the path of rotation of the members for slicing through the material during relative rotation of the members,
the edges of adjacent blades lying on opposite sides of a plane normal to the axis of rotation,
said wall surfaces of adjacent blades being angularly related to each other with their rear portions closer than their forward edge portions so as to return the material deflected laterally by the previous adjacent blade during relative rotation of the members.

6. A retarder roller according to claim 5 including an elastomeric tire mounted on an outer surface of one of the members.

7. A retarder roller comprising a stator, a rotor surrounding the stator and forming an enclosed housing having a wall, a semisolid material having dilatant fluid flow characteristics in the housing, and means on the rotor and stator for deforming the material, wherein the deforming means comprises vanes on the stator and means on all the walls of the housing for holding the material for rotation therewith, the vanes on the stator comprising members extending radially into the material, each having a wedge shaped portion presenting a sharp edge opposite to the direction of rotation of the rotor and material, the edges on consecutive vanes being on opposite sides of a common plane normal to the rotor axis.

8. A retarder roller according to claim 7 including an elastomeric tire mounted on an outer surface of one of the members.

9. A retarder roller comprising:
a cylindrical housing member closed at its ends,
an inner axially extending member within the housing member having end portions extending through the ends of the housing to permit relative rotation of the members,
a semi-solid material within the housing member having dilatant fluid flow characteristics,
the inner surface of the housing member being provided with means for engaging and retaining the material against rotational movement relative thereto,
and angularly spaced blades on the inner member within the housing projecting substantially radially with respect thereto into the material,
said blades each comprising an element providing a wedge-shaped portion with a sharp edge thereof facing the path of rotation of the members for slicing through the material during relative rotation of the members, and said sharp edges on consecutive blades being on opposite sides of a common plane normal to said axis.

10. A retarder roller according to claim 9 including an elastomeric tire mounted on an outer surface of one of the members.

11. A retarder roller comprising:

a cylindrical housing member closed at its ends, an inner axially extending member within the housing member having end portions extending through the ends of the housing to permit relative rotation of the members, a semi-solid material within the housing member having dilatant fluid flow characteristics, the inner surface of the housing member being provided with means for engaging and retaining the material against rotational movement relative thereto, and angularly spaced blades on the inner member within the housing projecting substantially radially with respect thereto into the material, said blades each comprising an element providing a wedge-shaped portion with a sharp edge thereof facing the path of rotation of the members for slicing through the material during relative rotation of the members, and said elements being of rhomboidal shape.

12. A retarder roller according to claim 11 wherein said sharp edges on consecutive vanes are on opposite sides of a common plane normal to said axis.

13. A retarder roller according to claim 12 including an elastomeric tire mounted on an outer surface of one of the members.

14. A retarder roller according to claim 11 including an elastomeric tire mounted on an outer surface of one of the members.

* * * * *